(12) United States Patent
Huybrechts et al.

(10) Patent No.: US 7,662,875 B2
(45) Date of Patent: Feb. 16, 2010

(54) AQUEOUS COATING COMPOSITIONS

(75) Inventors: Josef Huybrechts, Turnhout (BE); Koen Linsen, Bilzen (BE); Paul Bruylants, Hever (BE)

(73) Assignee: E.I. du Pont de Nemours and Company, Wilmington, DE (US)

( * ) Notice: Subject to any disclaimer, the term of this patent is extended or adjusted under 35 U.S.C. 154(b) by 470 days.

(21) Appl. No.: 11/436,238

(22) Filed: May 18, 2006

(65) Prior Publication Data
US 2006/0270782 A1 Nov. 30, 2006

Related U.S. Application Data

(60) Provisional application No. 60/684,118, filed on May 24, 2005.

(51) Int. Cl.
*C08G 18/28* (2006.01)
(52) U.S. Cl. .......... 524/198; 524/591; 524/507; 524/589; 524/590; 524/871; 524/873; 524/874; 524/875
(58) Field of Classification Search ........... 524/198, 524/507, 589, 590, 591, 871, 873–875
See application file for complete search history.

(56) References Cited

U.S. PATENT DOCUMENTS

| | | | |
|---|---|---|---|
| 4,311,622 A | 1/1982 | Buter | |
| 4,677,028 A | 6/1987 | Heeringa et al. | |
| 4,851,294 A | 7/1989 | Buter et al. | |
| 5,164,449 A * | 11/1992 | Nicks | ......... 525/131 |
| 6,156,840 A * | 12/2000 | Nakamae et al. | ............ 524/839 |

FOREIGN PATENT DOCUMENTS

| | | |
|---|---|---|
| EP | 0192304 A1 | 8/1986 |
| EP | 0198519 A1 | 8/1986 |
| WO | WO 2005/033166 A1 | 4/2005 |

* cited by examiner

*Primary Examiner*—David Wu
*Assistant Examiner*—Vu Nguyen
(74) *Attorney, Agent, or Firm*—Sudhir G. Deshmukh

(57) ABSTRACT

The invention is directed to aqueous coating compositions with improved rheology performance, comprising A) at least one water-dilutable binder,
    optionally, at least one cross-linking agent B), at least one sagging control agent C) obtainable by reacting a polyisocyanate with an amine, water and optionally usual coating additives, pigments and/or organic solvents,
    wherein the sagging control agent is obtained by reacting in an aqueous phase in presence of a water-dilutable binder C1) at least one polyisocyanate with C2) at least one amine having at least one primary amino group and at least one hydroxyl group.

16 Claims, No Drawings

US 7,662,875 B2

AQUEOUS COATING COMPOSITIONS

CROSS-REFERENCE TO RELATED APPLICATION

This application claims the benefit of U.S. Provisional Application Ser. No. 60/684,118 filed on May 24, 2005 which is hereby incorporated by references in its entirety.

BACKGROUND OF THE INVENTION

The invention relates to aqueous coating compositions with improved rheological performance for automotive and industrial coatings based on water-dilutable binders and a reaction product of a polyisocyanate and an amine as sagging control agent (SCA). The invention also relates to a process for preparing aqueous coating compositions containing those SCAs.

DESCRIPTION OF THE PRIOR ART

A fundamental requirement of paints and coatings is that they must flow well, but not run. Good flow requires the viscosity to be kept sufficiently low for long enough to allow the surface of the coating to form an even smooth surface under the influence of surface tension. When the coating remains "open" in this way, however, dripping may occur on vertical surfaces due to the influence of shear force. To prevent dripping, the viscosity must be as high as possible to stop the thin coating from flowing. This means that the viscosity of the coating must be relatively low during and shortly after application—to ensure good flow—and relatively high thereafter—to prevent dripping. In order to obtain good flow without dripping, rheology additives, e.g., SCAs are added to the coating material.

SCAs in coating compositions are well-known. These are low-molecular, semi-crystalline, urea based organic compounds, whose principle function is an antisettling agent, which can set a certain high viscosity in a resting coating material. These SCAs are particularly used in solvent-based high-solids and medium-solids coating compositions.

For example, U.S. Pat. No. 4,311,622 discloses thixotropic coating compositions prepared from a binder and a SCA, which is the reaction product of a diisocyanate and a monoamine or hydroxy monoamine. The reaction between the diisocyanate and the monoamine is carried out in the presence of an inert organic solvent. If the SCA is prepared in situ in the binder, it is preferred to carry out the reaction between the diisocyanate and the monoamine in an atmosphere of an inert gas at temperatures of 10 to 150° C.

Similarly, EP-A-0 198 519 discloses thixotropic coating compositions comprising a SCA, which is the reaction product of a diisocyanate and a mono- or diamine containing a primary amine group and an ether group. Furthermore, EP 192 304 discloses thixotropic coating compositions comprising a SCA, which is the reaction product of an isocyanurate-trimer from a diisocyanate and an amine with at least one primary amine group. The SCAs are always prepared in presence of organic solvents or in the presence of solvent-based binder formulations. The SCAs are suitable for use in solvent-based coating compositions having a high-solids content.

Against the background of increasingly stringent environmental legislation, water-based paints have become more and more important in recent years in various fields of application, including, vehicle painting. Water-soluble or water-dispersible binders are provided for the production of water-based paints. In addition those water-based paints also require additives, e.g., SCAs, which are specifically adapted to the use in aqueous coating compositions and which do not cause a noticeable increase in the content of organic solvents in the aqueous composition when being incorporated in into the aqueous composition.

There was, therefore, a need for thixotropic aqueous coating compositions based on water-dilutable binders and SCAs, which, on the one hand, show the desired rheological and optical properties and appearance and, on the other hand, contain only very small amounts of organic co-solvents and lead to color-free, completely clear and transparent aqueous clear coats.

SUMMARY OF THE INVENTION

The present invention relates to aqueous coating compositions comprising
A) at least one water-dilutable binder,
B) optionally, at least one cross-linking agent,
C) at least one sagging control agent (SCA) obtainable by reacting a polyisocyanate with an amine,
D) water and optionally,
E) usual coating additives, pigments, fillers and/or organic solvents, wherein the SCA C) is obtained by reacting
C1) at least one polyisocyanate with
C2) at least one amine having at least one primary amine group and at least one hydroxyl group in an aqueous phase in presence of a water-dilutable binder, preferably in presence of the water-dilutable binder A).

The present invention also relates to a process (P1) for preparing aqueous coating compositions containing SCAs, comprising the following steps:
I) providing at least one water-dilutable binder A) in form of an aqueous dispersion, optionally, in combination with usual coating additives, pigments, fillers and/or organic solvents,
II) reacting in the aqueous dispersion of the water-dilutable binder A):
C1) at least one polyisocyanate with
C2) at least one amine having at least one primary amine group and at least one hydroxyl group and optionally
III) mixing the aqueous composition obtained in step II with additional components of the coating composition.

In a further embodiment the present invention relates to a process (P2) for preparing aqueous coating compositions containing SCAs, comprising the following steps:
I. providing an aqueous coating composition comprising at least one water-dilutable binder, water, usual coating additives and optionally, pigments, fillers, organic solvents and/or at least one crosslinking agent,
II. preparing a SCA containing composition (F) by
  IIa) providing at least one water-dilutable binder A) in form of an aqueous dispersion, optionally, in combination with usual coating additives, pigments, fillers and/or organic solvents,
  IIb) reacting in the aqueous dispersion of the water-dilutable binder A):
    C1) at least one polyisocyanate with
    C2) at least one amine having at least one primary amine group and at least one hydroxyl group and
III) mixing the SCA containing composition (F) prepared in step II into the aqueous coating composition provided in step I.

The present invention also relates to a SCA containing aqueous composition (F), comprising
A) at least one water-dilutable binder,
C) at least one sagging control agent (SCA) obtainable by reacting a polyisocyanate with an amine,
D) water and optionally,
E) usual coating additives, pigments, fillers and/or organic solvents, wherein the SCA C) is obtained by reacting
C1) at least one polyisocyanate with C2) at least one amine having at least one primary amine group and at least one hydroxyl group in an aqueous dispersion of the water-dilutable binder A).

Preferably, the SCA containing aqueous composition (F) comprises 70 to 99.5% by weight of the water-dilutable binder A), 0.5 to 30% by weight of the SCA C) and 0 to 70% by weight of usual coating additives pigments and/or fillers, wherein the sum of the portions of components A, C and usual coating additives pigments and/or fillers make up 100% by weight (based on solids).

Preferably, the aqueous dispersion of the water-dilutable binder A), in which the reaction of the at least one polyisocyanate C1) with the at least one amine having at least one primary amine group and at least one hydroxyl group C2) is carried out, has a viscosity of >500 cps, more preferably of 1000 cps or more than 1000 cps. The upper limit of viscosity can be e.g., 30,000 cps. A preferred range for the viscosity of the aqueous dispersion of the water-dilutable binder A) is >500 to 30,000 cps, a more preferred range is 1000 to 10,000 cps. Viscosity as used here is the starting viscosity, i.e. the viscosity of the aqueous dispersion of the water-dilutable binder A) prior to the addition of components C1) and/or C2).

The viscosity is measured by Brookfield at 2-20 rpm.

DETAILED DESCRIPTION OF THE INVENTION

The term (meth)acrylic as used here and hereinafter should be taken to mean methacrylic and/or acrylic.

Unless stated otherwise, all molecular weights (both number and weight average molecular weight) referred to herein are determined by GPC (gel permeation chromatographie) using polystyrene as the standard.

The present invention is directed to aqueous coating compositions. Aqueous coating compositions are coating compositions, wherein water is used as solvent or thinner when preparing and/or applying the coating composition. Usually, aqueous coating compositions contain 20 to 80% by weight of water, based on the total amount of the coating composition and optionally, up to 15% by weight, preferably, below 10% by weight of organic solvents, based on the total amount of the coating composition.

Aqueous dispersion shall be used as synonym for the group consisting of aqueous solution, aqueous emulsion and aqueous dispersion.

It was surprising and not obvious, that it was possible to achieve stable compositions with sufficient rheology performance, when preparing the SCA according to the invention in situ directly in the aqueous phase in presence of the water-dilutable binder A). SCAs based on compositions disclosed in the prior art, e.g., based on standard SCAs of diisocyanates and benzylamine or based on diisocyanates and ether amines could not be prepared directly in the aqueous phase in presence of a water-dilutable binder. Either the compositions had no rheological response or compositions full of lumps were obtained.

The coating composition of the present invention preferably, comprises 0.1 to 30% by weight solids, especially preferred, 0.5 to 10% by weight solids of the SCA C), based on the total amount of coating composition.

In one embodiment the aqueous coating composition preferably comprises:
10-90% by weight solids of the at least one water-dilutable binder A),
0-70% by weight solids of the at least one curing agent B),
0.1-20% by weight solids of the at least one SCA C) and
0-70% by weight solids of pigments, extenders and/or usual coating additives wherein the % by weight solids of components A) to C) and the pigments, extenders and/or usual coating additives add up to 100%.

Component A) of the coating composition according to the invention comprises water-dilutable binders which may contain functional groups suitable for crosslinking reactions with appropriate crosslinkers.

The water-dilutable binders which can be used are not subject to any particular restrictions. All water-dilutable binders usually used to prepare aqueous coating compositions, e.g., in the field of automotive and industrial coating can be used as binder component A). Those water-dilutable binders as well as preparation methods for the binders are known to the person skilled in the art and are disclosed in detail in various patents and other documents. Examples of water-dilutable binders are polyurethane(urea) resins, polyester resins, (meth)acrylic copolymer resins, epoxy resins, polysiloxane resins, alkyd resins, cellulose esters, melamine resins and any hybrid binders derived therefrom. The hybrid binders comprise combinations of at least two binders, in particular, selected from among polyurethane(urea) resins, polyester resins and (meth)acrylic copolymer resins, wherein the binders, of which there are at least two, are bound together covalently and/or in the form of interpenetrating resin molecules.

The water-dilutable binders A) may comprise non-functional or reactive resins. The binders may be physically drying, self cross-linking or externally cross-linking. Crosslinking may occur for example, by ionic and/or radical polymerisation, polycondensation and/or polyaddition reactions. Chemically cross-linkable binder systems contain cross-linkable functional groups. Suitable functional groups are, for example, hydroxyl groups, blocked hydroxyl groups, blocked isocyanate groups, acetoacetyl groups, unsaturated groups, for example, (meth)acryloyl groups and allyl groups, epoxide groups, carboxyl groups, carbamate amine groups and blocked amine groups.

The water-dilutable binders are oligomeric and/or polymeric compounds with a number average molecular weight of, e.g., 500 to 500,000 g/mole, preferably, of 1100 to 300,000 g/mole. They may also be present in form of microgels with infinite molecular weight, e.g., as polyurethane and/or acrylic microgels.

In order to ensure sufficient water dilutability of the binders A), these binders are modified in a suitable manner to render them hydrophilic. The binders A) may be ionically (anionically and/or cationically) and/or non-ionically modified. An anionic and/or non ionic modification is preferred. An anionic modification may be obtained, for example, by incorporating carboxyl groups or sulfonic acid groups which are at least partially neutralized. The anionic groups are neutralised with bases. Examples of basic neutralising agents are tertiary amines, such as, trimethylamine, triethylamine, dimethylethylamine, dimethylbutylamine, N-methylmorpholine, dimethylethanolamine and dimethylisopropanolamine. A non-ionic modification may be obtained, for example, by incorporating polyethylene oxide units. Alternatively, or in addition thereto, it is possible to obtain water-dilutability via external emulsifiers.

The coating composition according to the invention may optionally comprise at least one cross-linking agent B), which cross-linking agent is capable of entering into a cross-linking reaction with the reactive functional groups of binder component A). The cross-linking agents which can be used are not subject to any particular restrictions. All cross-linking agents usually used to prepare aqueous coating compositions, e.g., in the field of automotive and industrial coating can be used as component B). Those crosslinking-agents as well as preparation methods for the crosslinking-agents are known to the person skilled in the art and are disclosed in detail in various patents and other documents. Depending on the type of reactive functional groups of binder component A) the following cross-linking agents may, for example, be used: polyisocyanates with free isocyanate groups or with at least partially blocked isocyanate groups, polyepoxides, polyacetales, polyanhydrides, polycarboxylic compounds, alkoxy silane compounds, polyamines, carbamate functional resins and amine/formaldehyde condensation resins, for example, melamine resins.

Preferred combinations of binders/crosslinkers are: hydroxy functional binders and polyisocyanates, hydroxy functional binders and blocked polyisocyanates and/or melamine resins.

The binders with hydroxyl groups are, for example, the polyurethanes, (meth)acrylic copolymers, polyesters, polyethers and hybrids therefrom, known from polyurethane chemistry to the skilled person, which are used in the formulation of aqueous coating compositions. They may each be used individually or in combination with one another.

Generally binders with reactive functional groups can be used as well as binders without reactive functional groups, both alone or in combination with one another.

The binder component A) and the crosslinking agent B) are used in such proportion that the equivalent ratio of reactive functional groups of component A) to the corresponding reactive groups of the cross-linking agent B) can be 5:1 to 1:5, for example, preferably, 3:1 to 1:3, and in particular, preferably, 1.5:1 to 1:1.5.

The coating composition according to the invention comprises at least one SCA C). The SCA C) is prepared by reacting at least one polyisocyanate C1) with at least one amine C2) having at least one primary amine group and at least one hydroxyl group in the aqueous phase in presence of the water-dilutable binder A).

Any suitable polyisocyanate may be used as component C1) for the preparation of the SCA C). For example, any aliphatic, araliphatic, cycloaliphatic or aromatic polyisocyanate with a functionality of 2.0 to 5.0 can be used. The polyisocyanates usually contain 3 to 40, preferably 4 to 20 carbon atoms. It is preferred to use a symmetrical aliphatic or cycloaliphatic diisocyanate and/or oligomer of such a diisocyanate. Especially preferred are symmetrical diisocyanates and/or isocyanurate-trimers of symmetrical diisocyanates. Symmetrical diisocyanates and/or isocyanurate-trimers of symmetrical diisocyanates show the best rheological activity in coating compositions.

As suitable examples of diisocyanates that may be mentioned are the following: tetramethylene-1,4-diisocyanate, hexamethylene-1,6-diisocyanate, dicyclohexyl dimethylmethane-4,4'-diisocyanate, diphenylmethane-4,4'-diisocyanate, cyclohexyl-1,4-diisocyanate, dicyclohexyl methane-4,4'-diisocyanate, 1,5-dimethyl-2,4-di(diisocyanato ethyl) benzene, 1,3,5-trimethyl-2,4-di(diisocyanato methyl) benzene. Also oligomers of those diisocyanates, e.g., the dimeric and/or trimeric derivatives of the diisocyanates, such as, the uretdione, isocyanurate and biuret analogues can be used. The polyisocyanates may also contain carbodiimide, allophanate, urethane and urea groups. Preferred are the oligomers of hexamethylene-1,6-diisocyanate, especially preferred is the isocyanurate-trimer of hexamethylene-1,6-diisocyanate. Generally polyisocyanates can be used alone or in combination.

The second component to be used in the preparation of the SCA C) according to the invention is component C2), a hydroxy-amine having at least one primary amine group. For example, aliphatic and/or araliphatic mono- and polyamines having 1 to 18 carbon atoms can be used. Suitable hydroxy-monoamines are monohydroxy-monoamines with 1 to 18 carbon atoms, preferably, 1 to 4 carbon atoms, such as, 2-aminoethanol, 1-aminoethanol, 2-aminopropanol, 3-aminopropanol, 1-amino-2-propanol, 2-amino-2-methyl propanol, 2-aminobutanol, 5-aminopentanol and polyhydroxy-monoamines, such as, 2-amino-2-methyl-1,3-propane diol and 2-amino-2-ethyl-1,3-propane diol. Furthermore, hydroxy-diamines may be used as component C2), e.g., N-(2-aminoethyl)ethanol amine.

Also hydroxy ether amines may be used as component C2), e.g., 2-(2- minoethoxy) ethanol.

Hydroxy amines having at least one primary amine group may be used alone or in combination. It is especially preferred that 2-aminoethanol should be used.

In the reaction between the polyisocyanate and the hydroxy-amine for the preparation of the SCA C) either the polyisocyanate or the hydroxy-amine may generally by employed in excess relative to the stoichiometric amount. For example, the ratio of the number of amino groups of the hydroxy-amine to the number of isocyanate groups of the polyisocyanate may be in the range of 0.7 to 1.5, which ratio, however, should preferably be 1:1. Hydroxy-amines C2) may be used alone or in combination with each other. They can also be used in combination with at least one additional amino-functional compound other than hydroxyl amine compound C2). Additional amines have to be chosen in that the reaction product (SCA C) is pseudoplastic and stable in water.

Pseudoplastic means that the high shear viscosity of the reaction product (SCA) at 300 rpm is at least 5 times lower than the viscosity at 3 rpm, each measured at a composition of 3% by weight of the SCA in water.

When using the additional amines it must be ensured that at least one, preferably two of the isocyanate functional groups of the polyisocyanate C1) are modified with the hydroxy amine C2). Those additional amines have for example molecular weights (Mn) of 70 to 5000. Examples of additional amine compounds are dialkanolamines, such as diethanol amine, diisopropanolamine, 2-amino -1-butanol, imidazole, 4(5)-nitroimidazole, 2- or 4-methylimidazolepiperazine, N-ethylpiperazine, 1-(2-hydroxyethyl)piperazinemorpholine, 2,6-dimethylmorpholine-hexamethyleneimine, piperidinepyrrolidine, N-mehtyl ethanolamine. Reaction products of primary amines and e.g. epoxy derivatives can also be used.

It is essential according to the present invention to prepare the SCA C) by reacting components C1) and C2) directly in the aqueous phase in presence of the water-dilutable binder A). The reaction may be carried out in presence of the entire amount of the water-dilutable binder A) or in presence of a part of the water-dilutable binder A), whereas the binder A) is present in form of its aqueous dispersion. Preferably, the reaction between components C1) and C2) is carried out in an aqueous dispersion of the water-dilutable binder A) having a viscosity of >500 cps, more preferably, of 1000 or more than 1000 cps. The upper limit of viscosity can be, e.g., 30,000 cps. A preferred range for the viscosity of the aqueous dispersion of the water-dilutable binder A) is >500 to 30,000, a more preferred range is 1000 to 10,000 cps. The viscosity is measured by Brookfield at 2-20 rpm. Viscosity as used here is the starting viscosity of the aqueous dispersion, i.e. the viscosity of the aqueous dispersion of the water-dilutable binder A) prior to the addition of components C1) and/or C2). If the SCA is prepared in an aqueous dispersion of the water-dilutable binder A) having a viscosity below 500 cps, unstable SCA compositions with lumps and seed are result. The desired viscosity of the aqueous dispersion of the water-dilutable binder A) may result from the aqueous dispersion of the water-dilutable binder A) itself or may be achieved by adding usual thickeners to the aqueous dispersion of the water-dilutable binder A). Usual thickeners are, e.g., alkali swellable thickeners, associative thickeners, silica and bentonite.

The aqueous dispersion of the water-dilutable binder A) may have a solids content of e.g., 10% to 65% by weight.

It must, however, be ensured that the functional groups of the water-dilutable binder A) do not react with the polyisocyanate C1) and the amine C2) when preparing the SCA in presence of the water-dilutable binder A).

Generally, the aqueous dispersion of the water-dilutable binder A) provided in step I of process P1 and provided in step IIa of process P2 may be mixed with other ingredients of the aqueous coating composition, e.g., with usual coating additives, e.g., thickeners, pigments, fillers and/or even, if not preferred, with organic solvents. After completion of the bulding reaction of the SCA C), in addition ingredients/components of the aqueous coating composition can be added in addition, e.g., usual coating additives, pigments, fillers, water and eventually small amounts of organic solvents. Also the crosslinking agent B) may be added at this stage.

The reaction between components C1) and C2) may be carried out in the following different ways in the aqueous binder dispersion of water-dilutable binder A):

1. The hydroxy amine C2) is mixed with the aqueous binder dispersion and subsequently the polyisocyanate C1) is added to the amine/binder mixture.
2. The polyisocyanate C1) is mixed with the aqueous binder dispersion and subsequently the hydroxy amine C2) is added to the polyisocyanate/binder mixture.
3. A mixture of the aqueous binder dispersion and the hydroxy amine C2) is mixed with a mixture of the aqueous binder dispersion and the polyisocyanate C1).
4. The hydroxy amine C2) and the polyisocyanate C1) are mixed simultaneously with the aqueous binder dispersion.

If desired, the addition of the polyisocyanate C1) and/or of the hydroxy amine C2) may be done in one or several steps. It should be ensured, when selecting way 2 or 3, that the polyisocyanate does not react with reactive groups of the binder A).

It is preferred that the reaction should be carried out at temperatures in the range of 0-95° C., more preferred in the range of 10- 40° C.

Although in general the reaction of components C1) and C2) may be combined in any arbitrarily chosen manner, e.g., such as, described above, it is preferred that the polyisocyanate C1) should be added to the hydroxy-amine C2), i.e., the hydroxy amine C2) is mixed with the aqueous binder dispersion and subsequently the polyisocyanate C1) is added to the amine/binder mixture.

Preferably the hydroxy-amine C2) is mixed with the aqueous binder dispersion and optionally, further amounts of water at high shear. After the mixture has been homogenized, the polyisocyanate C1) is added as fast as possible to the mixture with stirring.

Therefore, a preferred embodiment of the present invention is directed to a proces for preparing aqueous coating compositions comprising at least one SCA, comprising the following steps:

I) providing at least one water-dilutable binder A) in form of an aqueous dispersion, optionally, in combination with usual coating additives, pigments, fillers and/or organic solvents, II) mixing at least one amine C2) having at least one primary amine group and at least one hydroxyl group with the aqueous dispersion of the water-dilutable binder A), III) adding at least one symmetrical polyisocyanate C1) to the amine/binder mixture obtained in step II and optionally, IV) mixing the aqueous composition obtained in step III with additional components of the aqueous coating composition.

Generally, the aqueous coating composition according to the invention can be produced in that the SCA is produced in the presence of the water-reducible binder A) when preparing the aqueous coating compositions (according to process P1). The aqueous coating composition according to the invention can also be produced (according to process P2) in that a conventional aqueous coating composition, e.g., an aqueous base coat or aqueous clear coat, is produced in a known manner and the SCA containing composition (F) prepared in step II of process P2 is added as an additive during production of the coating composition or after production of the coating composition. When SCA containing composition (F) is added after production of the coating composition, it may be added as component of a mixing system, e.g., a mixing system for formulating a large number of different colours, comprising several mixing paints. It proves to be advantageous here that the SCA containing composition (F) is long-term stable, very compatible with the corresponding paint systems and may be easily incorporated.

Especially preferred is an embodiment where the water-dilutable binder A) present in the SCA containing composition (F) is similiar to or identical with the main water-reducible binder in the aqueous coating composition.

The coating compositions, according to the present invention, can contain pigments and/or fillers. All colour and/or special effect-giving pigments of organic or inorganic type used in paints are suitable for pigments. Examples of inorganic or organic colour pigments are titanium dioxide, micronised titanium dioxide, iron oxide pigments, carbon black, azo pigments, phthalocyanine pigments, quinacridone or pyrrolopyrrole pigments. Examples of special effect pigments are metal pigments for example, from aluminum or copper, interference pigments, such as, for example, aluminum coated with titanium dioxide, coated mica, graphite effect pigments. Examples of fillers are silicon dioxide, barium sulphate, talcum, aluminium silicate and magnesium silicate.

The coating compositions can also contain usual additives. These additives are additives usually used in the paint industry. Examples of such additives are light stabilizers, for example, based on benztriazoles and HALS compounds, rheology additives different from the SCAs C), thickeners, such as, cross-linked polycarboxylic acid or polyurethanes, antifoaming agents, wetting agents and catalysts for the crosslinking reaction. The additives are added in the usual amounts familiar to the person skilled in the art.

The coating compositions according to the invention contain furthermore, water, for example, 30-60% by weight, and possibly small amounts of organic solvents, e.g., up to 15% by weight, preferably, below 10% by weight based on the entire coating composition. The organic solvents are solvents conventionally used in coating techniques. These may originate from the preparation of the binders or are added separately. Examples of suitable solvents are monohydric or polyhydric alcohols, e.g., propanol, butanol, hexanol; glycol ethers or esters, for example, diethylene glycol dialkyl ether, dipropylene glycol dialkyl ether, each with C1- to C6-alkyl, ethoxypropanol, butyl glycol; glycols, for example, ethylene glycol, propylene glycol, N-methyl pyrrolidone and ketones, e.g., methyl ethyl ketone, acetone, cyclohexanone; aromatic or aliphatic hydrocarbons, for example, toluene, xylene, or straight-chain or branched aliphatic C6-C12-hydrocarbons. If organic solvents are present, water-miscible organic solvents are preferred.

Either transparent or pigmented coating compositions can be produced. Therefore, the coating compositions according to the invention are suited for use as clear coats but can be pigmented with conventional pigments and used as solid-color or effect topcoats, color- and/or special effect-imparting basecoats or undercoats such as sealer, primer or primer surfacer. They can be used to coat a substrate with a single coat or within a multilayer coating of substrates. The aqueous coating compositions may comprise single-component aqueous coating compositions or aqueous coating compositions producible by mixing two or more separately stored components.

The coating compositions, according to the invention, can be applied using known methods, in particular, by spray application. The coating compositions obtained can be cured at room temperature or forced at higher temperatures, for example, up to 80° C., preferably at 20 to 60° C. They can, however, even be cured at higher temperatures of, for example, 80 to 160° C. Curing temperatures are depending on the curing chemistry as well as the field of use of the aqueous coating compositions The coating compositions, according to the invention, are suitable for automotive and industrial coatings. In the automotive coatings sector, the coatings can be used for both vehicle production line painting and vehicle and vehicle part refinishing as well as for coating large vehicles and transportation vehicles, such as, trucks, busses and railroad cars. For vehicle production line painting, stoving (baking) temperatures of 80 to 140° C., for example, are used, preferably 110 to 130° C. For refinishing curing temperatures of for example, 20 to 80° C., in particular, 20 to 60° C. are used.

According to the present invention stable aqueous SCA containing compositions are provided, which can be easily incorporated into aqueous coating compositions. The SCAs based on polyisocyanates and hydroxy-amines can be incorporated into aqueous coating compositions without the requirement of using large amounts of organic solvents to ensure, e.g., appropriate application viscosity and a good appearance of the resultant coatings. The so prepared coating compositions show improved rheology performance, i.e., improved sagging of the applied composition. The resultant coatings show a good flow and low tendency to run. They are free of surface defects, such as, pinholes, sags and craters. Furthermore, color-less transparent clear coats can be prepared using the preparation method according to the present invention.

The invention will be further described by reference to the following Examples. All parts and percentages are on a weight basis unless otherwise indicated.

EXAMPLES

Example 1 (Preparation Example)

Preparation of a SCA Containing Composition:

1000 parts by weight of an aqueous dispersion of a water-reducible acrylate resin (see preparation below), 75 parts by weight of deionized water and 5.4 parts by weight of ethanol amine were mixed at high shear rate (1500 rpm) till a homogeneous composition was achieved. Then 18.4 parts by weight of hexamethylene diisocyanate trimer (90% in butylacetate, Desmodur® N3390 (from Bayer) were added as fast as possible under high shear. After that 3.2 parts by weight of ethoxypropanol were added as a rinse. The reaction mixture was held for additional 15 minutes at high shear. A stable thixotropic SCA containing composition was obtained, which was free from seed. Transparent films had been obtained when preparing draw-downs on glass panels dried at room temperature.

Preparation of the Aqueous Dispersion of a Water-Reducible Acrylate Resin

In a reactor with a propeller type of stirrer, a thermometer, condenser and monomer/initiator feeding system, 200 grams of Cardurao® E10 (CE10) (Glycidylester of C10 versatic acid available from Resolution) and 40 grams of ethoxypropanol (EPR) were loaded and heated to about 150° C. A mixture of 52 grams of 2-hydroxyethyl methacrylate (HEMA), 160 grams of styrene (S), 68 grams of acrylic acid (AA), 10 grams of dicumylperoxide (DCP), 40 grams of Cardura® E10 and 10 grams of EPR were added over 2 hours 30 minutes to the reactor while keeping the contents at 150° C. After the feed, the reactor contents were held for 30 minutes. After the 30 minutes hold period, 108 grams of HEMA, 30.4 grams of AA, 141.6 grams of n-butyl methacrylate (BMA), 5 grams of DCP and 25 grams of EPR were added over 2 hours and 30 minutes at about 150° C. followed by a rinsing step for the feed system of 5 grams of EPR. After the rinsing step, the contents of the reactor were held for 2 hours at 150° C. In a next step, 33 grams of dimethylamino ethanol (DMEA) were added for a theoretical acid value of 29.5, the amount corrected for the measured acid value.

The polymer blend was diluted with 865 grams of water preheated at about 70° C.

Test Results:

| | |
|---|---|
| Solids | 44.8% |
| Viscosity | 8800 cps |
| Acid value | 33.6 mg KOH/g |
| pH | 8 |
| Mn | 3700 |
| Mw | 24500 |

Comparative Example 1 (Preparation Example)

Preparation of a SCA Containing Composition:

The same procedure had been followed as in example 1, with the only difference that ethanol amine had been replaced by benzyl amine on a molar basis. The SCA containing composition obtained in that way showed lumps. Cloudy films were obtained when preparing draw-downs on glass panels dried at room temperature.

Paint Examples

The following pigment dispersions were used for the preparation of topcoats:

| | |
|---|---|
| Dispersion 1 | 73 parts of TiPure ® R706 (TiO$_2$) pigment from DuPont |
| | 8.3 parts of a dispersing agent as described in |
| | U.S. Pat. No. 5,231,131, Example 1 |
| | (neutralized graft copolymer) |
| | 1.5 parts of a wetting agent (Surfynol ® 104 from Air |
| | Products) |
| | 1.7 parts of AMP95 (amino methylpropanol) |
| | 3 parts of Dowanol DPM (solvent) |
| | 12.5 parts of demineralised water |

-continued

| | |
|---|---|
| Dispersion 2 | Bayferrox 3920 dispersion |
| Dispersion 3 | 10 parts of Raven ® 5000 from Columbian Chemicals (carbon black pigment) |
| | 16 parts of a dispersing agent as described in U.S. Pat. No. 5,231,131, Example 1 (neutralized graft copolymer) |
| | 0.3 parts of a wetting agent (Surfynol ® 104 from Air Products) |
| | 1.8 parts of AMP95 (amino methylpropanol) |
| | 71.9 parts of demineralised water |

The following isocyanate solution has been used for the preparation of topcoats:

| | |
|---|---|
| Activator | 80 parts of Desmodur ® N 3600 (100% solids hexamethylenediisocyanate trimer from Bayer) |
| | 20 parts of butyl glycol acetate |

Paint Example 1

A white topcoat formulation was prepared by mixing 60.0 parts of the SCA containing composition of Example 1 with 0.1 parts of a wetting agent (Byk® 380N (Byk Chemie)) and 0.4 parts of a defoaming agent (Byk® 011 (Byk Chemie). To this mixture, 26.0 parts of dispersion 1, 0.3 parts of dispersion 2 and 0.1 parts of dispersion 3 were added and mixed. To this blend 13.0 parts of water were added and mixed in.

100 parts of the above-mentioned topcoat were mixed with 21.5 parts of the activator.

Paint Example 2

A white topcoat formulation was prepared by mixing 30.4 parts of the aqueous dispersion of a water-reducible acrylate of Example 1 with 30.1 parts of the SCA containing composition of Example 1, 0.1 parts of a wetting agent (Byk® 380N (Byk Chemie)) and 0.4 parts of a defoaming agent (Byk® 011 (Byk Chemie). To this mixture, 27.4 parts of dispersion 1, 0.3 parts of dispersion 2 and 0.1 parts of dispersion 3 were added and mixed. To this blend 11.2 parts of water were added and mixed in.

100 parts of the above-mentioned topcoat were mixed with 22.3 parts of the activator.

Comparative Paint Example 1 (without SCA Containing Composition)

A white topcoat formulation was prepared by mixing 50 parts of the aqueous dispersion of a water-reducible acrylate resin of Example 1 with 0.1 parts of a wetting agent (Byk® 380N (Byk Chemie)) and 0.4 parts of a defoaming agent (Byk® 011 (Byk Chemie). To this mixture, 29.0 parts of dispersion 1, 0.4 parts of dispersion 2 and 0.1 parts of dispersion 3 were added and mixed. To this blend 9.2 parts of water were added and mixed in.

100 parts of the above-mentioned topcoat were mixed with 23.1 parts of the activator.

Paints 1 and 2 and comparative paint 1 were sprayed with an automated application device using a standardised spray program (Kohne id113) that applies the topcoat in a wedge spray and allows a reliable comparison of the sagging limits obtained. The sagging limit is expressed as the dry film build at which the paint shows a sag of 7 mm.

| | Sagging limit, µm |
|---|---|
| Paint example 1 | 81 |
| Paint example 2 | 75 |
| Comparative example 1 | 70 |

Improved sagging limits have been achieved by using the SCA containing compositions according to the invention. In paint example 1 the SCA containing composition has been used as main binder (100%). In paint example 2 the SCA containing composition was mixed-up with an aqueous acrylate resin dispersion (50:50). Especially good results are achieved when the binder of the topcoat is only based on the SCA containing composition.

What we claim is:

1. An aqueous coating composition, comprising:
   A) at least one water-dilutable binder,
   B) optionally, at least one cross-linking agent,
   C) 0.1 to 30% by weight solids of at least one sagging control agent, based on the total amount of coating composition,
   D) water and optionally,
   E) coating additives, pigments and/or organic solvents,
   wherein the sagging control agent is obtained by reacting in an aqueous phase in presence of said water-dilutable binder:
      C1) at least one polyisocyanate with
      C2) at least one amine having at least one primary amino group and at least one hydroxyl group.

2. The aqueous coating composition of claim 1, comprising 0.5 to 10% by weight solids of the sagging control agent C), based on the total amount of coating composition.

3. The aqueous coating composition of claim 1, wherein component C1) is a symmetrical diisocyanate and/or isocyanurate-trimer of a symmetrical diisocyanate.

4. The aqueous coating composition of claim 1, wherein component C1) is isocyanurate-trimer of hexamethylene-1,6-diisocyanate.

5. The aqueous coating composition of claim 1, wherein component C2) is a monohydroxy amine having one primary amine group.

6. The aqueous coating composition of claim 1, wherein component C2) is 2-amino ethanol.

7. The aqueous coating composition of claim 1, wherein amine component C2) is used in combination with at least one additional amino-functional compound other than amine component C2).

8. The aqueous coating composition of claim 1, wherein the water-dilutable binder A) is selected from a group consisting of hydroxy-functional polyurethane(urea) resins, hydroxy-functional polyester resins, hydroxy-functional (meth)acrylic copolymer resins, hybrids of said resins and mixtures therefrom.

9. A sagging control agent containing aqueous composition comprising:
   A) at least one water-dilutable binder,
   C) 0.5 to 30% by weight solids of at least one said sagging control agent, based on the total amount of coating composition,
   D) water and optionally,
   coating additives, pigments, fillers and/or organic solvents,
   wherein the sum of the portions of the components A), C) and the coating additives, pigments and/or fillers make up 100% by weight, based on solids, and wherein the sagging control agent C) is obtained by reacting
- C1) at least one polyisocyanate with
- C2) at least one amine having at least one primary amine group and at least one hydroxyl group in an aqueous dispersion of the water-dilutable binder A).

10. Sagging control agent containing the aqueous composition of claim 9, comprising:
- 70 to 99.5% by weight of the water-dilutable binder A), and
- 0 to 70% by weight of the coating additives, pigments and/or fillers, wherein the sum of the portions of the components A), C) and the coating additives, pigments and/or fillers make up 100% by weight, based on solids.

11. A process for preparing the aqueous coating composition of claim 1, comprising the following steps:
- I) providing at least one water-dilutable binder A) in the form of an aqueous dispersion, optionally, in combination with the coating additives, pigments, fillers and/or organic solvents,
- II) reacting in the aqueous dispersion of the water-dilutable binder A):
  - C1) at least one symmetrical polyisocyanate and
  - C2) at least one amine having at least one primary amine group and at least one hydroxyl group; and
- III) mixing the aqueous composition obtained in step II with additional components of the aqueous coating composition.

12. A process for preparing the aqueous coating composition of claim 1, comprising the following steps:
- I) providing at least one said water-dilutable binder A) in the form of an aqueous dispersion, optionally, in combination with coating additives, pigments, fillers and/or organic solvents,
- II) mixing at least one said amine C2) having at least one said primary amine group and at least one said hydroxyl group with the aqueous dispersion of the water-dilutable binder A),
- III) adding at least one said polyisocyanate C1) to the amine/binder mixture obtained in step II, wherein said polyisocyanate C1) is a symmetrical polyisocyanate, and
- IV) mixing the aqueous composition obtained in step III with additional components of the aqueous coating composition.

13. A substrate coated with a layer of the coating compositions of claim 1.

14. A substrate coated with a multi-layer coating where at least one layer is the coating composition of claim 1.

15. A clear coating composition comprising the coating composition of claim 1.

16. A pigmented coating composition comprising the coating composition of claim 1 and at least one pigment.

* * * * *